United States Patent
Xie et al.

(10) Patent No.: US 10,872,054 B2
(45) Date of Patent: *Dec. 22, 2020

(54) WIDE PROGRAMMABLE GAIN RECEIVER DATA PATH FOR SINGLE-ENDED MEMORY INTERFACE APPLICATION

(71) Applicant: Integrated Device Technology, Inc., San Jose, CA (US)

(72) Inventors: Yi Xie, Shanghai (CN); Yue Yu, Johns Creek, GA (US); Yuan Zhang, Shanghai (CN); Yu Min Zhang, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,081

(22) Filed: Oct. 23, 2019

(65) Prior Publication Data

US 2020/0057744 A1 Feb. 20, 2020

Related U.S. Application Data

(63) Continuation of application No. 16/020,086, filed on Jun. 27, 2018, now Pat. No. 10,496,587.

(51) Int. Cl.
*G06F 13/42* (2006.01)
*G06F 13/40* (2006.01)

(52) U.S. Cl.
CPC ...... *G06F 13/4234* (2013.01); *G06F 13/4068* (2013.01)

(58) Field of Classification Search
None
See application file for complete search history.

(56) References Cited

U.S. PATENT DOCUMENTS

| 5,473,666 | A  | * | 12/1995 | Szczebak, Jr. | ......... | H04M 3/22 |
|  |  |  |  |  |  | 375/345 |
| 9,496,906 | B2 | * | 11/2016 | Rafi | ................. | H04B 1/123 |
| 9,531,086 | B1 | * | 12/2016 | Bulzacchelli | ......... | H01Q 21/22 |
| 10,205,425 | B2 | * | 2/2019 | Maxim | ................ | H03G 1/0023 |
| 2001/0013075 | A1 | * | 8/2001 | Otsuka | ................ | G06F 13/4072 |
|  |  |  |  |  |  | 710/33 |
| 2008/0061886 | A1 | * | 3/2008 | Simbuerger | ......... | H03F 1/0277 |
|  |  |  |  |  |  | 330/295 |
| 2009/0230980 | A1 | * | 9/2009 | Williams | ............... | G01R 27/32 |
|  |  |  |  |  |  | 324/707 |

(Continued)

*Primary Examiner* — Michael Sun
(74) *Attorney, Agent, or Firm* — Christopher P. Maiorana, PC

(57) ABSTRACT

An apparatus includes an interface and a plurality of impedance branches. The interface may be configured to receive a data signal and a plurality of selection signals. The plurality of impedance branches may comprise a group of branches and a separated branch. The plurality of impedance branches may be configured to adjust an impedance value and a gain of a data path for the data signal in response to the selection signals. The group of branches may be controlled in response to the selection signals to select the impedance value and a first gain value in a first mode. The separated branch may replace one of the plurality of impedance branches in the group of branches in response to the selection signals to select a second gain value in a second mode.

20 Claims, 7 Drawing Sheets

(56) References Cited

U.S. PATENT DOCUMENTS

| | | | |
|---|---|---|---|
| 2010/0064265 A1* | 3/2010 | Inoue | G06F 30/367 |
| | | | 716/136 |
| 2010/0283547 A1* | 11/2010 | Dally | H03G 3/3036 |
| | | | 330/279 |
| 2015/0381129 A1* | 12/2015 | Brekelmans | H03F 3/45475 |
| | | | 330/254 |
| 2017/0063327 A1* | 3/2017 | Myjak | B06B 1/0253 |
| 2017/0294888 A1* | 10/2017 | Berkhout | H03G 3/3015 |
| 2018/0062600 A1* | 3/2018 | Lee | H03F 1/223 |
| 2020/0091608 A1* | 3/2020 | Alpman | H04B 7/0639 |

\* cited by examiner

WIDE PROGRAMMABLE GAIN RECEIVER DATA PATH FOR SINGLE-ENDED MEMORY INTERFACE APPLICATION

This application relates to U.S. Ser. No. 16/020,086, filed Jun. 27, 2018, which is incorporated by reference in its entirety.

FIELD OF THE INVENTION

The invention relates to memory generally and, more particularly, to a method and/or apparatus for implementing a wide programmable gain receiver data path for single-ended memory interface application.

BACKGROUND

Each generation of memory interface products is designed to handle faster data rates and more and more complicated applications. In terms of receiver design, the signal integrity design is much more challenging than for previous memory generations. The receiver has to tolerate different channel losses and reflections for all applications. For example, the data rate has a large range from 3.2 Gps to 4.6 Gps. Different manufacturers might each have different customized signal path designs. The receiver has to support both 1 dpc (DIMMs per channel) and 2 dpc applications.

It would be desirable to implement a wide programmable gain receiver data path for single-ended memory interface application.

SUMMARY

The invention concerns an apparatus comprising an interface and a plurality of impedance branches. The interface may be configured to receive a data signal and a plurality of selection signals. The plurality of impedance branches may comprise a group of branches and a separated branch. The plurality of impedance branches may be configured to adjust an impedance value and a gain of a data path for the data signal in response to the selection signals. The group of branches may be controlled in response to the selection signals to select the impedance value and a first gain value in a first mode. The separated branch may replace one of the plurality of impedance branches in the group of branches in response to the selection signals to select a second gain value in a second mode.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a wide programmable gain receiver data path for single-ended memory interface application that may (i) improve signal integrity, (ii) provide programmability of gain, (iii) provide programmability of AC peaking, (iv) provide programmability of bandwidth, (v) provide a wide gain range, (vi) provide two independent input branches in the continuous-time linear equalizer, (vii) reduce capacitive loading, (viii) provide high AC peaking in a high frequency range and/or (ix) be implemented as one or more integrated circuits.

Figure 1:
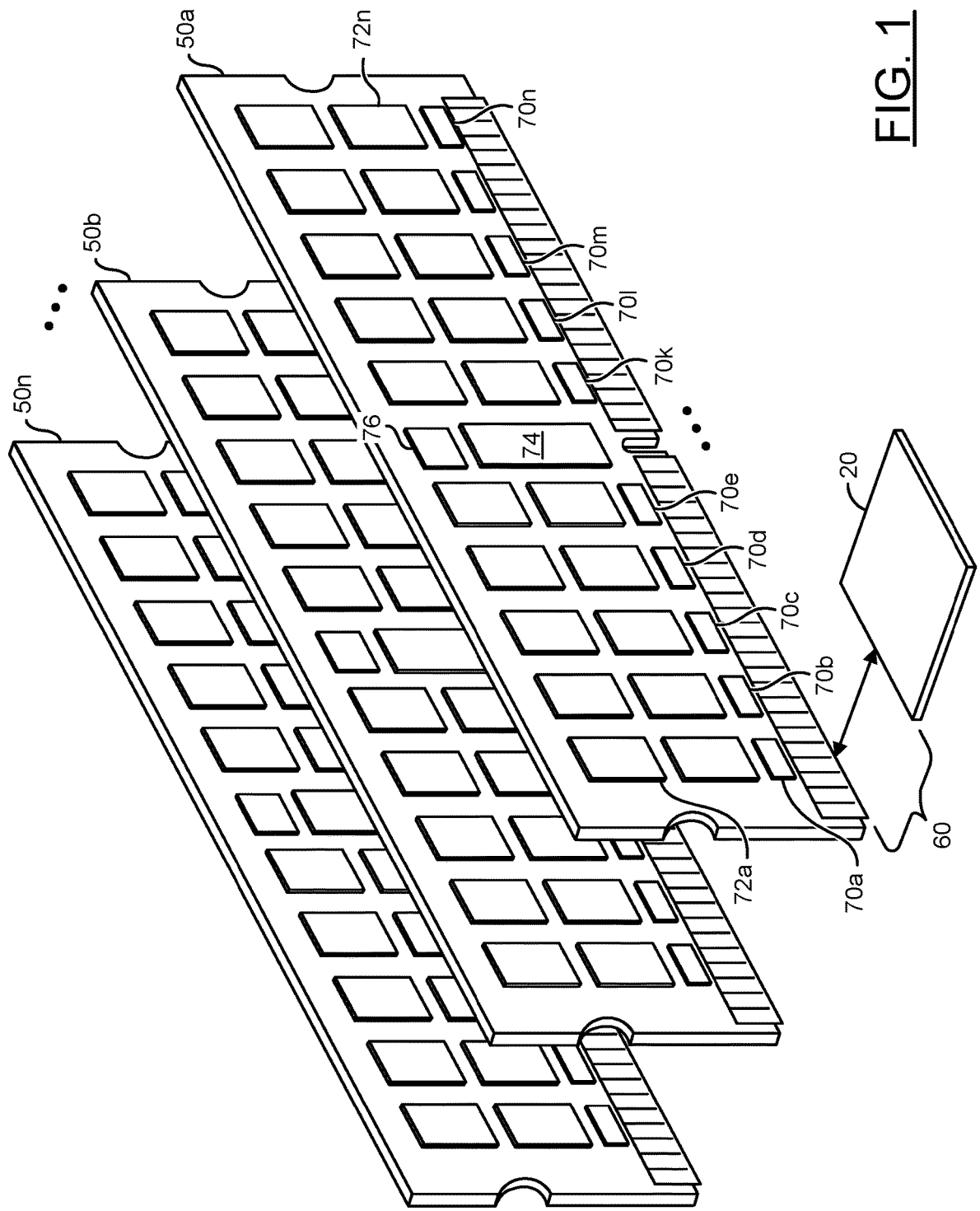
FIG. 1 is a diagram illustrating an example embodiment of a memory system.

Referring to FIG. 1, a diagram of a memory system is shown in accordance with an example embodiment of the invention. In various embodiments, the memory system includes a number of circuits $50a$-$50n$. The circuits $50a$-$50n$ may be implemented as memory modules (or boards). In an example, the circuits $50a$-$50n$ may be implemented as dual in-line memory modules (DIMMs). In some embodiments, the circuits $50a$-$50n$ may be implemented as double data rate fourth generation (DDR4) synchronous dynamic random-access memory (SDRAM) modules. In some embodiments, the circuits $50a$-$50n$ may be implemented as double data rate fifth generation (DDR5) SDRAM modules.

In various embodiments, the circuits $50a$-$50n$ may comprise a number of blocks (or circuits) $70a$-$70n$, a number of blocks (or circuits) $72a$-$72n$, a block (or circuit) 74, a block (or circuit) 76 and/or various other blocks, circuits, pins, connectors and/or traces. The circuits $70a$-$70n$ may be configured as data buffers. The circuits $72a$-$72n$ may implement memory devices. In an example, the circuits $72a$-$72n$ may be implemented as synchronous dynamic random-access memory (SDRAM) devices (or chips, or modules). The circuit 74 may be implemented as a registered clock driver (RCD). In an example, the RCD circuit 74 may be implemented as a DDR4 RCD circuit. In another example, the RCD circuit 74 may be implemented as a RCD circuit compliant with the DDR5 standard. The circuit 76 may be implemented as a power management integrated circuit (PMIC). The type, arrangement and/or number of components of the memory modules $50a$-$50n$ may be varied to meet the design criteria of a particular implementation.

The memory modules $50a$-$50n$ are shown connected to a block (or circuit) 20. The circuit 20 may implement a memory controller and/or host controller. The circuit 20 may be located in another device, such as a computing engine. Various connectors/pins/traces 60 may be implemented to connect the memory modules $50a$-$50n$ to the memory controller 20. In some embodiments, the connectors/pins/traces 60 may be a 288-pin configuration. In an example, the memory controller 20 may be a component of a computer motherboard (or main board or host device). In another example, the memory controller 20 may be a component of a microprocessor. In yet another example, the memory controller 20 may be a component of a central processing unit (CPU).

In an example, some of the connectors/pins/traces 60 may be part of the memory modules $50a$-$50n$ and some of the connectors/pins/traces 60 may be part of the motherboard and/or memory controller 20. The memory modules $50a$-$50n$ may be connected to the computer motherboard (e.g., by pins, traces and/or connectors 60) to transfer data between components of a computing device and the memory modules $50a$-$50n$. In some embodiments, the connectors/pins/traces 60 may implement an 80-bit bus. In an example, the memory controller 20 may be implemented on a northbridge of the motherboard and/or as a component of a microprocessor (e.g., an Intel CPU, an AMD CPU, an ARM CPU, etc.). The implementation of the memory controller 20 may be varied according to the design criteria of a particular implementation.

In various embodiments, the circuits 50a-50n may be implemented as DDR4 (or DDR5) SDRAM memory modules. In an example, the circuits 50a-50n may have a memory module density of 512 gigabyte (GB), one terabyte (TB), or higher per module (e.g., compared to 128 GB per dual in-line memory module (DIMM) in DDR3). In embodiments implementing DDR4 SDRAM memory modules, the circuits 50a-50n may operate at voltages of 1.2-1.4 volts (V) with a frequency between 800-4266 megahertz (MHZ) (e.g., compared to 1.5-1.65V at frequencies between 400-1067 MHZ in DDR3). In embodiments implementing DDR5 standard SDRAM memory modules, the circuits 50a-50n may operate with a frequency of 4.4 GHz, 6.6 GHz and/or higher frequencies. In embodiments implementing DDR5 standard SDRAM memory modules, there may be 5 memory modules on each side of the RCD 74.

In some embodiments, the circuits 50a-50n may be implemented as low voltage DDR4 memory modules and operate at 1.05V. For example, in embodiments implementing low voltage DDR4 SDRAM memory modules, the circuits 50a-50n may implement 35% power savings compared to DDR3 memory. In embodiments implementing DDR4 SDRAM memory modules, the circuits 50a-50n may transfer data at speeds of 2.13-4.26 giga-transfers per second (GT/s) and higher (e.g., compared to 0.8-2.13GT/s in DDR3). In embodiments implementing DDR5 standard SDRAM memory modules, the circuits 50a-50n may have a data rate range from 3.2GT/s to 4.6GT/s. The operating parameters of the memory modules 50a-50n may be varied according to the design criteria of a particular implementation.

In an example, the memory modules 50a-50n may be compliant with the DDR4 specification entitled "DDR4 SDRAM", specification JESD79-4A, November 2013, published by the Joint Electron Device Engineering Council (JEDEC) Solid State Technology Association, Arlington, Va. Appropriate sections of the DDR4 specification (e.g., the DDR4 JEDEC specification) are hereby incorporated by reference in their entirety. In another example, the memory modules 50a-50n may be implemented according to a fifth generation (DDR5) standard (e.g., for which a standard is currently under development by JEDEC). References to the DDR5 standard may refer to a latest working and/or draft version of the DDR5 specification published and/or distributed to committee members by JEDEC as of May 2018. Appropriate sections of the DDR5 standard are hereby incorporated by reference in their entirety.

In some embodiments, the memory modules 50a-50n may be implemented as DDR4 load reduced DIMM (LRDIMM). The data buffers 70a-70n may allow the memory modules 50a-50n to operate at higher bandwidth and/or at higher capacities compared to DDR4 RDIMM (e.g., 2400 or 2666 MT/s for DDR4 LRDIMM compared to 2133 or 2400 MT/s for DDR4 RDIMM at 384 GB capacity). For example, compared to DDR4 RDIMM configurations, the DDR4 LRDIMM configuration of the memory modules 50a-50n may allow improved signal integrity on data signals and/or better intelligence and/or post-buffer awareness by the memory controller 20.

Figure 2:
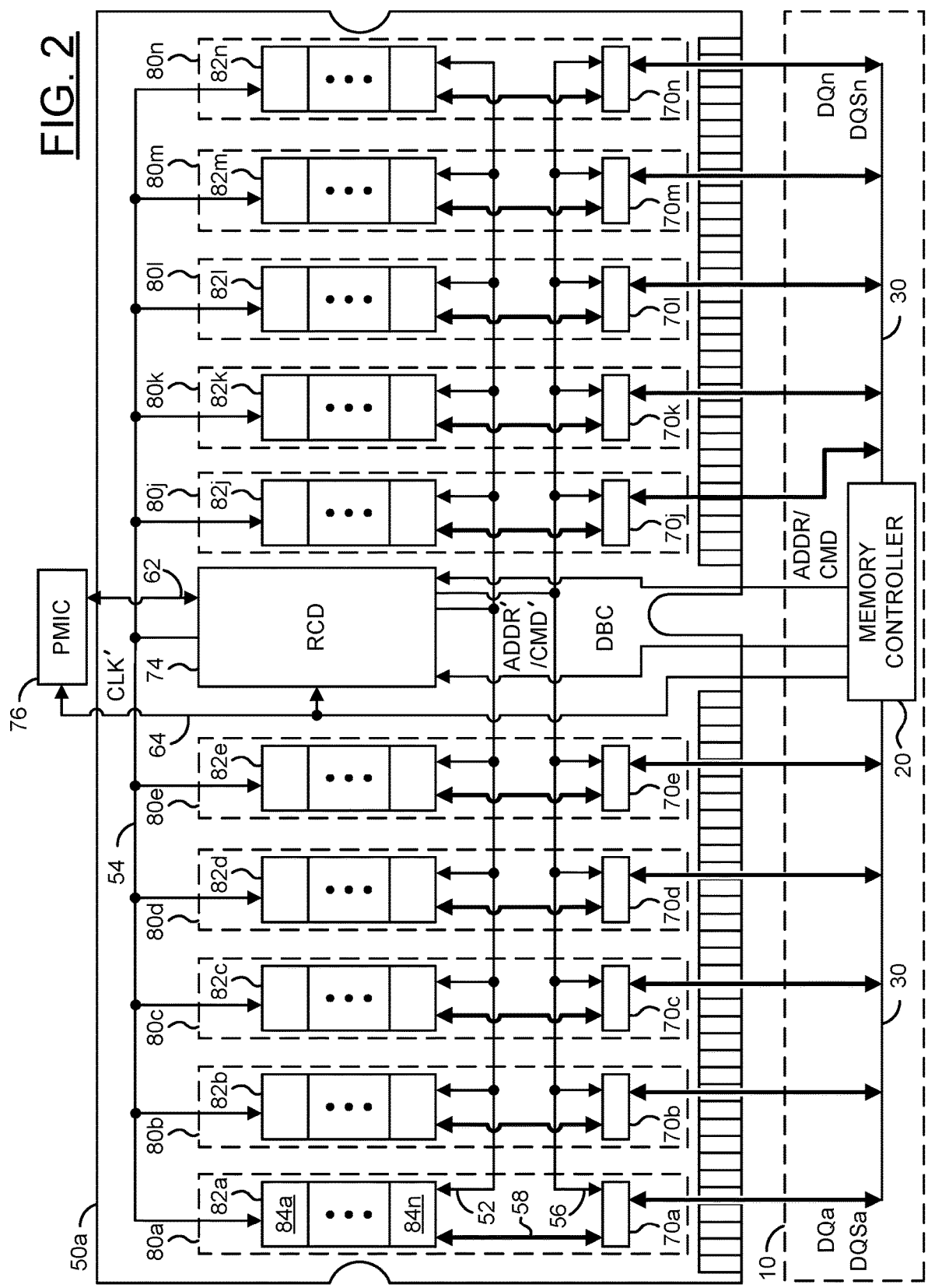
FIG. 2 is a block diagram illustrating a memory module of FIG. 1.

Referring to FIG. 2, a block diagram is shown illustrating a memory module 50a of FIG. 1. The memory module 50a may be representative of the memory modules 50b-50n. The memory module 50a is shown communicating with the memory controller 20. The memory controller 20 is shown as part of a block (or circuit) 10. The circuit 10 may be a motherboard (or main board), or other electronic component or computing engine or host device that communicates with the memory module 50a.

The memory module 50a may comprise one or more blocks (or circuits) 80a-80n, the RCD circuit 74 and/or the PMIC 76. The circuits 80a-80n may implement data paths of the memory module 50a. For example, the data path 80a may include a block 82a and/or the data buffer 70a. The data paths 80b-80n may have similar implementations. In the example shown, the memory module 50a may comprise five data paths (e.g., 80a-80e) on one side of the RCD 74 and five data paths (e.g., 80j-80n) on another side of the RCD 74. The circuits 82a-82n may each be implemented as a memory channel. Each of the memory channels 82a-82n may comprise a number of blocks (or circuits) 84a-84n. The circuits 84a-84n may be implemented as random access memory (RAM) chips. For example, the RAM chips 84a-84n may implement a volatile memory such as dynamic RAM (DRAM). The RAM chips 84a-84n may be the SDRAM devices 72a-72n (e.g., the chips 84a-84n may comprise one or more of the circuits 72a-72n located within one of the memory channels 82a-82n). In some embodiments, the RAM chips 84a-84n may be physically located on both sides (e.g., the front and back) of the circuit board of the memory modules 50a-50n. A capacity of memory on the memory module 50a may be varied according to the design criteria of a particular implementation.

The memory controller 20 may generate a signal (e.g., CLK), a number of control signals (e.g., ADDR/CMD) and/or a number of commands. The signal CLK and/or the signals ADDR/CMD may be presented to the RCD circuit 74. The commands may be presented to the PMIC 76 via a bus 64. A data bus 30 may be connected between the memory controller 20 and the data paths 80a-80n. The memory controller 20 may generate and/or receive data signals (e.g., DQa-DQn) and data strobe signals (e.g. DQSa-DQSn) that may be presented/received from the data bus 30. Portions of the signals DQa-DQn and DQSa-DQSn may be presented to respective data paths 80a-80n.

The RCD circuit 74 may be configured to communicate with the memory controller 20, the data buffers 70a-70n, the memory channels 82a-82n and/or the PMIC 76. The RCD circuit 74 may decode instructions (e.g., control words) received from the memory controller 20. For example, the RCD circuit 74 may receive register command words (RCWs). In another example, the RCD circuit 74 may receive buffer control words (BCWs). The RCD circuit 74 may be configured to train the DRAM chips 84a-84n, the data buffers 70a-70n and/or command and address lines between the RCD circuit 74 and the memory controller 20. For example, the RCWs may flow from the memory controller 20 to the RCD circuit 74. The RCWs may be used to configure the RCD circuit 74.

The RCD circuit 74 may be used in both LRDIMM and RDIMM configurations. The RCD circuit 74 may implement a 32-bit 1:2 command/address register. The RCD circuit 74 may support an at-speed bus (e.g., a BCOM bus between the RCD circuit 74 and the data buffers 70a-70n). The RCD circuit 74 may implement automatic impedance calibration. The RCD circuit 74 may implement command/address parity checking. The RCD circuit 74 may control register RCW readback. In some embodiments, the RCD circuit 74 may implement a 1 MHz inter-integrated circuit ($I^2C$) bus (e.g., a serial bus). In some embodiments, the RCD circuit 74 may implement a 12.5 MHz inter-integrated circuit (I³C) bus. Inputs to the RCD circuit 74 may be pseudo-differential using external and/or internal voltages. The clock outputs, command/address outputs, control outputs and/or data buffer control outputs of the RCD circuit 74 may be enabled in groups and independently driven with different strengths.

The RCD circuit 74 may receive the signal CLK and/or the signals ADDR/CMD from the memory controller 20. Various digital logic components of the RCD circuit 74 may be used to generate signals based on the signal CLK and/or the signals ADDR/CMD and/or other signals (e.g., RCWs). The RCD circuit 74 may also be configured to generate a signal (e.g., CLK') and signals (e.g., ADDR'/CMD'). For example, the signal CLK' may be a signal Y_CLK in the DDR4 specification. The signal CLK' and/or the signals ADDR'/CMD' may be presented to each of the memory channels 82a-82n. For example, the signals ADDR'/CMD' and CLK' may be transmitted on a common bus 52 and a common bus 54, respectively. The RCD circuit 74 may generate one or more signals (e.g., DBC). The signals DBC may be presented to the data buffers 70a-70n. The signals DBC may implement data buffer control signals. The signals DBC may be transmitted on a common bus 56 (e.g., a data buffer control bus).

The data buffers 70a-70n may be configured to receive commands and data from the bus 56. The data buffers 70a-70n may be configured to generate/receive data to/from the bus 30. The bus 30 may comprise traces, pins and/or connections between the memory controller 20 and the data buffers 70a-70n. A bus 58 may carry the data between each of the data buffers 70a-70n and respective memory channels 82a-82n. The data buffers 70a-70n may be configured to buffer data on the buses 30 and 58 for write operations (e.g., data transfers from the memory controller 20 to the corresponding memory channels 82a-82n). The data buffers 70a-70n may be configured to buffer data on the buses 30 and 58 for read operations (e.g., data transfers from the corresponding memory channels 82a-82n to the memory controller 20).

The data buffers 70a-70n may exchange data with the DRAM chips 84a-84n in small units (e.g., 4-bit nibbles). In various embodiments, the DRAM chips 84a-84n may be arranged in multiple (e.g., two) sets. For two set/two DRAM chip (e.g., 84a-84b) implementations, each set may contain a single DRAM chip (e.g., 84a or 84b). Each DRAM chip 84a-84b may be connected to the respective data buffers 70a-70n through an upper nibble and a lower nibble. For two set/four DRAM chip (e.g., 84a-84d) implementations, each set may contain two DRAM chips (e.g., 84a-84b or 84c-84d). A first set may be connected to the respective data buffers 70a-70n through the upper nibble. The other set may be connected to the respective data buffers 70a-70n through the lower nibble. For two set/eight DRAM chip (e.g., 84a-84h) implementations, each set may contain four of the DRAM chips 84a-84h. A set of four DRAM chips (e.g., 84a-84d) may connect to the respective data buffers 70a-70n through the upper nibble. The other set of four DRAM chips (e.g., 84e-84h) may connect to the respective data buffers 70a-70n through the lower nibble. Other numbers of sets, other numbers of DRAM chips, and other data unit sizes may be implemented to meet the design criteria of a particular implementation.

The DDR4 LRDIMM configuration may reduce a number of data loads to improve signal integrity on a data bus (e.g., the bus 30) of the memory module from a maximum of several (e.g., four) data loads down to a single data load. The distributed data buffers 70a-70n may allow DDR4 LRDIMM designs to implement shorter I/O trace lengths compared to DDR3 LRDIMM designs, which use a centralized memory buffer. For example, shorter stubs connected to the memory channels 82a-82n may result in less pronounced signal reflections (e.g., improved signal integrity). In another example, the shorter traces may result in a reduction in latency (e.g., approximately 1.2 nanoseconds (ns), which is 50% less latency than DDR3 buffer memory). In yet another example, the shorter traces may reduce I/O bus turnaround time. For example, without the distributed data buffers 70a-70n (e.g., in DDR3 memory applications) traces would be routed to a centrally located memory buffer, increasing trace lengths up to six inches compared to the DDR4 LRDIMM implementation shown in FIG. 2.

In some embodiments, the DDR4 LRDIMM configuration may implement nine of the data buffers 70a-70n. The memory modules 50a-50n may implement 2 millimeter (mm) frontside bus traces and backside traces (e.g., the connectors/pins/traces 60). A propagation delay through the data buffers 70a-70n may be 33% faster than through a DDR3 memory buffer (e.g., resulting in reduced latency). In some embodiments, the data buffers 70a-70n may be smaller (e.g., a reduced area parameter) than a data buffer used for DDR3 applications.

An interface 62 is shown. The interface 62 may be configured to enable communication between the RCD circuit 74 and the PMIC 76. For example, the interface 62 may implement a register clock driver/power management integrated circuit interface (e.g., a RCD-PMIC interface). The interface 62 may comprise one or more signals and/or connections. Some of the signals and/or connections implemented by the interface 62 may be unidirectional. Some of the signals and/or connections implemented by the interface 62 may be bidirectional. The interface 62 may be enabled by the host memory controller 20. In one example, the memory controller 20 may enable the interface 62 for the RCD using the signal ADDR/CMD. In another example, the memory controller 20 may enable the interface 62 for the PMIC 76 by presenting an enable command.

The bus 64 may be implemented as a host interface bus. The host interface bus 64 may be bi-directional. The host interface bus 64 may be configured to communicate commands and/or other data to the PMIC 76 and/or other components of the memory module 50a. In some embodiments, the bus 64 may communicate with the RCD 74. In some embodiments, the host interface bus 64 may implement an I²C protocol. In some embodiments, the host interface bus 64 may implement an I³C protocol. The protocol implemented by the host interface 64 may be varied according to the design criteria of a particular implementation.

Figure 3:
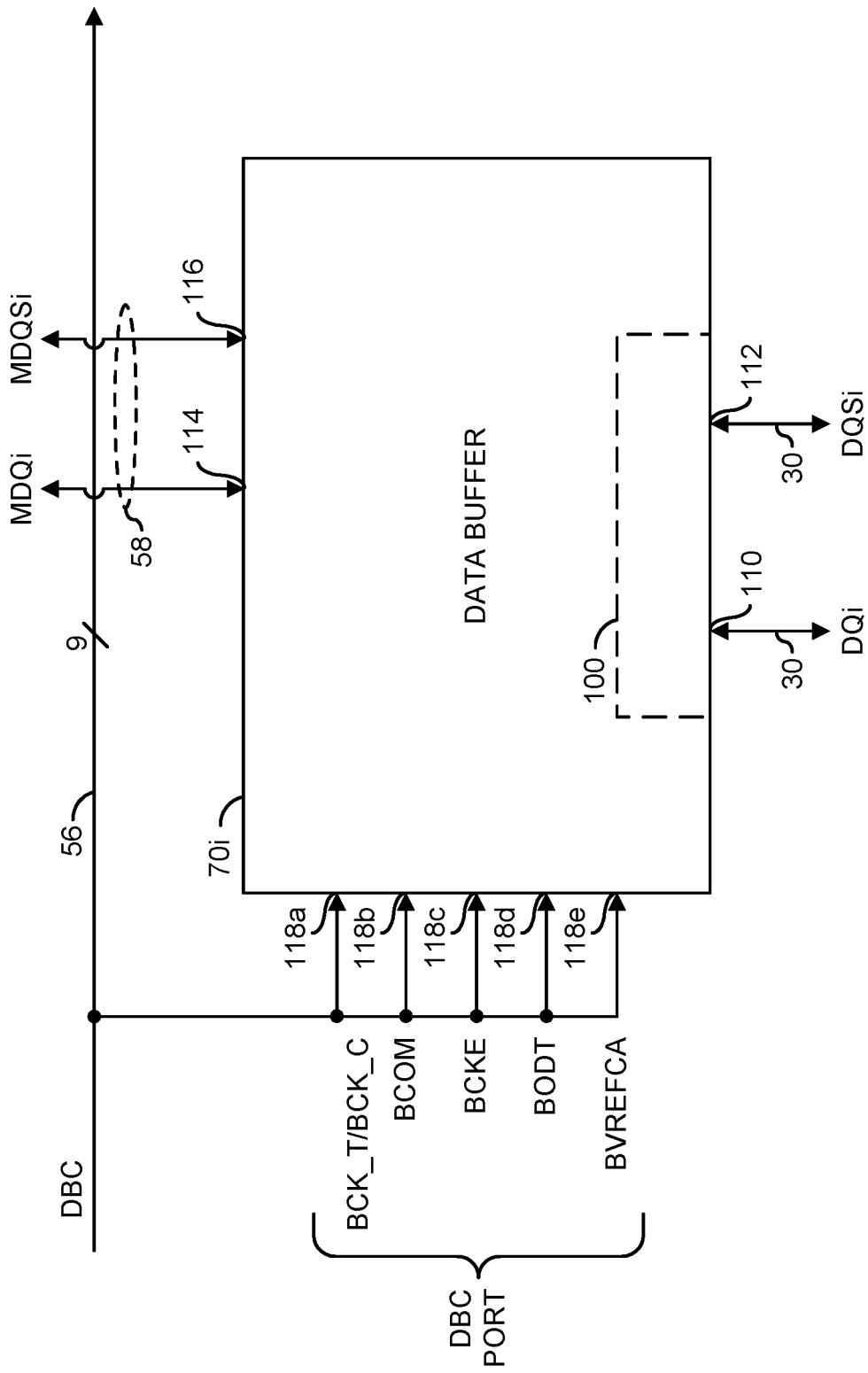
FIG. 3 is a block diagram illustrating an example data buffer of FIG. 1.

Referring to FIG. 3, a diagram is shown illustrating a data buffer 70i in accordance with an example embodiment of the invention. The data buffer 70i may be representative of an example embodiment of the data buffers 70a-70n. The data buffer 70i is shown having a first input/output 110, a second input/output 112, a third input/output 114 and a fourth input/output 116.

The first input/output 110 is configured for presenting/receiving the signals DQi (e.g., the data signals DQ corresponding to a memory channel) between the data buffer 70i and the controller 20. The second input/output 112 is configured for presenting/receiving the signals DQSi (e.g., the data strobe signals DQS corresponding to the memory channel) between the data buffer 70i and the controller 20. The third input/output 114 is configured for presenting/receiving the signals DQi as memory input/output signals (e.g., MDQi) corresponding to a memory channel between the data buffer 70*i* and the respective memory devices (e.g., DRAM chips) 72*a*-72*n*. The fourth input/output 116 is configured for presenting/receiving the signals DQSi as memory input/output signals (e.g., MDQSi) corresponding to a memory channel between the data buffer 70*i* and the respective memory devices (e.g., DRAM chips) 72*a*-72*n*.

The signals MDQi and/or MDQSi are generally transmitted between the memory modules 72*a*-72*n* and the respective data buffers 70*a*-70*n*. In an example, data (e.g., the signals DQi) and/or a data strobe (e.g., the signal DQSi) from the memory controller 20 may be presented to the data buffer 70*i*, buffered in the data buffer 70*i*, then transmitted to the respective memory device(s) 72*a*-72*n*. In another example, data from the respective memory device(s) 72*a*-72*n* (e.g., MDQi) and/or a data strobe (e.g., the signal MDQSi) may be presented to the data buffer 70*i*, buffered in the data buffer 70*i*, and then transmitted on an appropriate memory channel to the memory controller 20.

The data buffer 70*i* is shown also receiving signals (e.g., DBC) from the bus 56 at a control port (e.g., DBC PORT). The signals DBC may be presented to the data buffers 70*a*-70*n* (e.g., using the data buffer control bus 56). In an example, the signals DBC are illustrated comprising five signals transmitted over 9 pins/bits (e.g., a pair of signals BCK_T/BCK_C, a signal BCOM, a signal BCKE, a signal BODT and/or a signal BVREFCA). However, other numbers of pins/bits may be implemented accordingly to meet the design criteria of a particular application. The control port of the data buffer 70*i* is shown having an input 118*a* receiving the signals BCK_T/BCK_C, an input 118*b* receiving the signal BCOM, an input 118*c* receiving the signal BCKE, an input 118*d* receiving the signal BODT, and an input 118*e* receiving the signal BVREFCA.

In various embodiments, the signals BCK_T/BCK_C may be implemented as a 2-bit signal representing a differential (e.g., true (T) and complementary (C) versions) clock signal for the duplex data buffers 70*a*-70*n*. In an example, the signals BCK_T/BCK_C may represent a system clock. In various embodiments, the signal BCOM may be implemented as a 4-bit signal representing data buffer commands. However, other numbers of bits may be implemented accordingly to meet the design criteria of a particular application. The signal BCOM may be implemented as a unidirectional signal from the RCD circuit 74 to the data buffers 70*a*-70*n*. In an example, the signal BCOM may be implemented at a single data rate (e.g., 1 bit per signal per clock cycle). However, a particular command may take a different number of clock cycles to transfer information. The signal BCKE may be a function registered dedicated non-encoded signal (e.g., DCKE). The signal BODT may be a function registered dedicated non-encoded signal (e.g., DODT). The signal BVREFCA may be a reference voltage for use with pseudo-differential command and control signals.

The data buffers 70*a*-70*n* may receive a set of data buffer commands (e.g., for writing buffer control words (BCWs)) from the signals DBC. The buffer control words may be used to customize operation of the data buffers 70*a*-70*n*. The buffer control words may flow from the memory controller 20, through the RCD circuit 74, to the data buffers 70*a*-70*n*. The buffer control words may be similar to register control words (RCWS) used for configuring the RCD circuit 74. Similar to commands for writing the register control words, the commands for writing the buffer control words may look like an MRS7 command, where the address lines are really the payload.

In embodiments where the bus 56 comprises nine pins, the RCD circuit 74 may do more than pass a buffer control word directly through to the data buffers 70*a*-70*n*. In one example, the RCD circuit 74 may convert (e.g., multiplex) an MRS7 command format into a buffer control word in a BCOM format. The RCD circuit 74 may map the 12 address bits of the MRS7 command into five separate data transfers, each 4 bits wide. The five data transfers may be set up back to back over the bus 56. For example, 5 clock cycles plus a parity cycle may be used to complete the buffer command in the buffer control word. Once the buffer control word reaches the data buffers 70*a*-70*n*, the data buffers 70*a*-70*n* may decode the buffer control word, write the buffer control word to a function space of the data buffer, and complete the buffer command in the buffer control word.

A function of the signal BCOM may be to transmit the buffer control words. However, compliant with the JEDEC specification for DDR4 SDRAM and/or the DDR5 standard, the RCD circuit 74 may send all read/write commands and MRS information over the bus 56 (e.g., to allow the data buffers 70*a*-70*n* to keep track of what the memory devices 72 are doing). In some embodiments, different buffer commands may take a different number of cycles to transfer the information.

The RCD circuit 74 may receive an MRS7 command from the memory controller 20 (e.g., from a host). For example, a host may want to change a parameter (e.g., typically on initialization or boot up of a computing device). The RCD circuit 74 may check the MRS7 command to determine whether the address bit 12 is set to 1 (e.g., a logical one). In an example, when an address bit 12 of the MRS7 command is set to 1, the RCD circuit 74 may recognize the command as a buffer command (e.g., a command that is not meant for the RCD circuit 74). The RCD circuit 74 may convert the command from the memory controller 20 to a buffer control word and send the buffer control word to the data buffers 70*a*-70*n* via the bus 56. The data buffers 70*a*-70*n* may write the buffer control word to a function space to complete the command.

The data buffers 70*a*-70*n* may be configurable. The buffer commands may allow the memory controller 20 to customize aspects of termination (e.g., ODT), signal strength on the DQ lines, and/or events (e.g., receiver timing, driver timing, etc.) in both directions (e.g., for both read and write operations). In some embodiments, some of the configurations of the data buffers 70*a*-70*n* may be decided based on system level configurations. Generally, most of the configuration of the data buffers 70*a*-70*n* may be decided during training steps. During training steps, host controllers (e.g., the memory controller 20) may test and compare results of various training steps to determine an optimal configuration.

In various embodiments, the bus 56 may be used to send commands/data to program configuration registers of the data buffers 70*a*-70*n*. The bus 56 may also send commands (e.g., data reads and/or data writes) that control data traffic through the data buffers 70*a*-70*n*. For example, some commands may optimize power consumption and noise filtering (e.g. equalization) of the data buffers 70*a*-70*n*. In another example, read/write delays may be added per data line.

The data buffers 70*a*-70*n* may implement dual multi-bit (e.g., 4-bit) bi-directional data registers with differential data strobes (e.g., DQS_T/DQS_C). The data buffers 70*a*-70*n* may implement automatic impedance calibration. The data buffers 70*a*-70*n* may implement BCOM parity checking. The data buffers 70*a*-70*n* may implement control register (e.g., buffer control word) readback.

In some embodiments, the data buffers 70a-70n may comprise a block (or circuit or module or apparatus) 100. The circuit 100 implemented in one or more of the data buffers 70a-70n. The circuit 100 may implement a receiver to enable a data path structure configured to provide a wide programmable gain for tuning signal integrity. In an example, the gain may be programmed to values between −6 dB to +6 dB. The apparatus 100 may provide the wide programmable gain range without termination performance loss.

Figure 4:
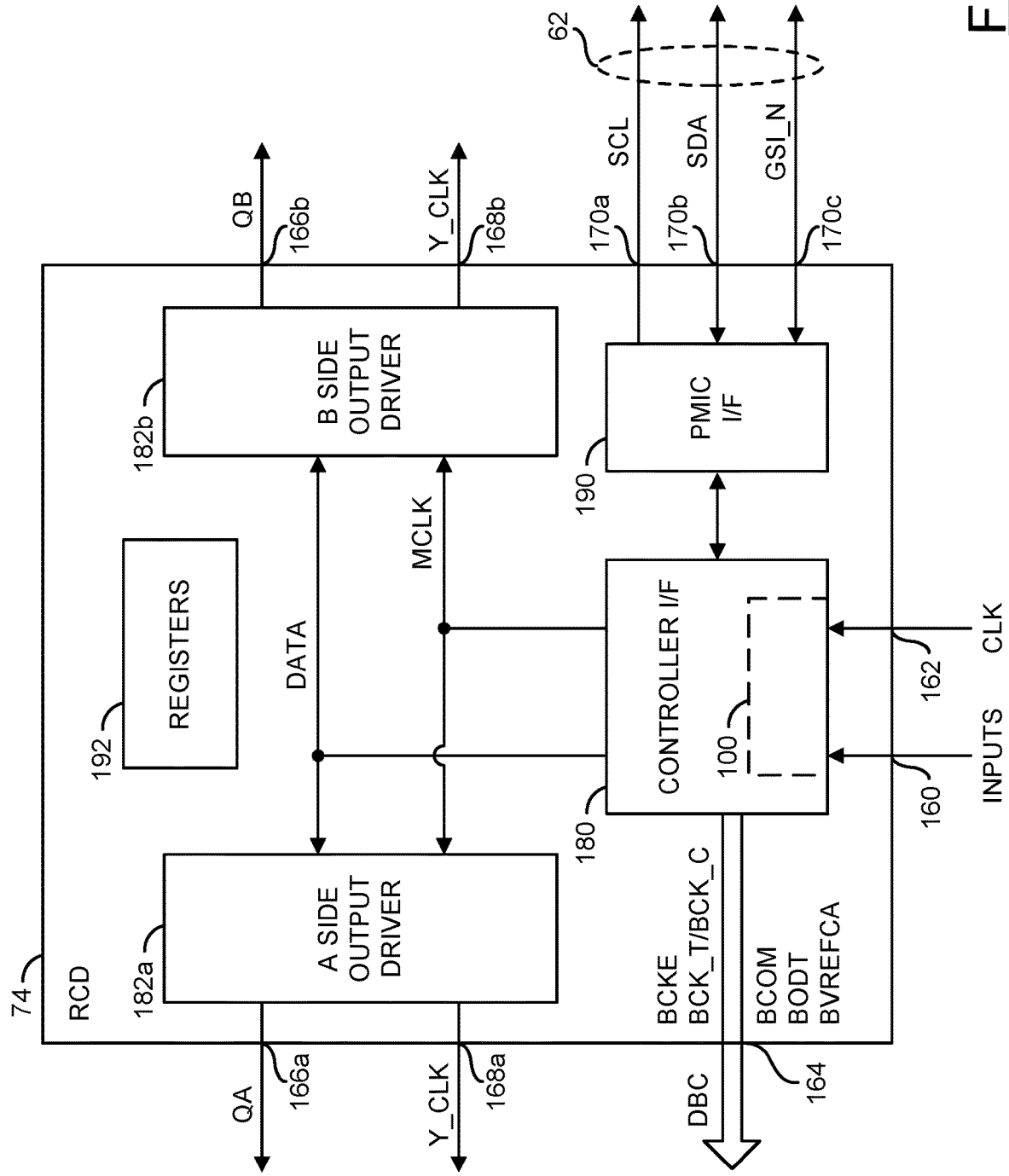
FIG. 4 is a diagram illustrating a registered clock driver (RCD) in accordance with an embodiment of the invention.

Referring to FIG. 4, a diagram is shown illustrating the registered clock driver 74 in accordance with an embodiment of the invention. In various embodiments, the circuit 74 may implement a registered clock driver circuit (or chip). In various embodiments, the circuit 74 may be JEDEC compliant (e.g., compliant with the DDR4 specification entitled "DDR4 SDRAM", specification JESD79-4A, November 2013, published by the Joint Electron Device Engineering Council (JEDEC) Solid State Technology Association, Arlington, Va. and/or compliant with the DDR5 standard).

The circuit 74 may have an input 160 that receives input data (e.g., INPUTS), an input 162 that receives the clock signal CLK, an input/output 164 that may receive/transmit control information (e.g., DBC), outputs 166a and 166b that may provide data outputs (e.g., the Q outputs QA and QB, respectively), outputs 168a and 168b that may provide output clock signals (e.g., Y_CLK) and/or inputs/outputs 170a-170c that may send/receive data via the interface 62. The signals INPUTS and CLK may be received from a memory controller (e.g., the memory controller 20 in FIG. 1) via a memory bus of a motherboard. In an example, the signals INPUTS may be pseudo-differential using an external or internal voltage reference. The signals INPUTS may comprise the ADDR/CMD signals of FIGS. 1 and 2. In an example, the signal CLK may be implemented as differential clock signals CLK_t (true) and CLK_c (complement). The signals QA, QB, and Y_CLK may be presented to a number of memory chips (e.g., 84a-84n in FIG. 2). For example, the signals QA, QB and Y_CLK may implement an output address and control bus for a DDR4 RDIMM, DDR4 LRDIMM, DDR4 UDIMM and/or DDR5 memory module. The signal DBC may be implemented as a data buffer control bus.

The output 170a may present a signal (e.g., SCL). The input/output 170b may communicate a signal (e.g., SDA). The input/output 170c may communicate a signal (e.g., GSI_N). The signal SCL may be a clock signal. The signal SDA may be a data signal. For example, the signal SDA may communicate power data. The signal GSIN may be an interrupt signal. The signal SDA and/or the signal GSIN may be a bi-directional signal. The signal SCL, the signal SDA and/or the signal GSI_N may each be a portion of the information communicated using the RCD-PMIC interface 62. The number of signals, the number of connections and/or the type of data communicated using the RCD-PMIC interface 62 may be varied according to the design criteria of a particular implementation.

In various embodiments the circuit 74 may comprise a block 180, blocks (or circuits) 182a-182b, a block (or circuit) 190 and/or a block (or circuit) 192. The block 180 may implement a controller interface. The blocks 182a and 182b may implement output driver circuits. In some embodiments, the blocks 182a and 182b may be combined as a single output driver circuit 182. The block 190 may implement a PMIC interface (or port) 190. The block 192 may implement register space. The RCD circuit 74 may comprise other components (not shown). The number, type and/or arrangement of the components implemented by the RCD 74 may be varied according to the design criteria of a particular implementation.

The block 180 may be configured to generate a data signal (e.g., DATA) and a clock signal (e.g., MCLK). The block 180 may be configured to generate the pair of signals (e.g., BCK_T/BCK_C), a signal (e.g., BCOM), a signal (e.g., BCKE), a signal (e.g., BODT) and/or a signal (e.g., BVREFCA). The signals DATA and MCLK may be presented to the blocks 182a and 182b. In various embodiments, the signal DATA may be coupled to the blocks 182a and 182b by combinatorial logic (not shown). The blocks 182a and 182b may be configured to generate the signals QA, QB and Y_CLK.

The block 190 may be configured to generate the signal SCL. The block 190 may be configured to generate and/or receive the signal SDA and/or the signal GSI_N. The block 190 may be coupled with the controller interface 180. For example, the PMIC interface 190 and/or the controller interface 180 may be configured to facilitate communication between the PMIC 76 and the memory controller 20. The PMIC interface 190 may be enabled in response to the enable command received from the host memory controller 20. In an example, the enable command may be a VR Enable command generated by the host memory controller 20.

The block 192 may be configured to store data. For example the block 192 may comprise a number of registers used for reading from and/or writing to the RCD circuit 74. Generally, the register space 192 is coupled to the various components of the RCD using combinational logic (not shown). The block 192 may comprise a pre-defined register space to store and/or communicate power data received from and/or to be written to the PMIC 76. The pre-defined registers may store configuration data used to adjust an operating state and/or a status of the RCD 74, the interface 62 and/or the PMIC 76. In some embodiments, one or more counters may be implemented to track control words received from the host memory controller 20.

In various embodiments, the circuit 74 may be enabled to automatically adjust a skew time of a plurality of output pins during a manufacturing test operation. In various embodiments, the circuit 74 may be enabled to adjust the skew time (e.g., tSkew) to within a single gate delay of a reference output clock. As used herein, the term tSkew may be defined as the phase difference between an output data signal or pin (e.g., Q) and an output clock signal or pin (e.g., Y_CLK). In an example, a DDR4 registered clock driver (RCD) may have sixty-six output pins. In another example, a DDR5 standard registered clock driver (RCD) may have a number of pins defined by the DDR5 standard. However, other numbers of output pins may be implemented to meet the design criteria of a particular implementation.

The circuit 74 may be configured to adjust the phase of the output pins relative to the clock signal Y_CLK (or to respective copies of the clock signal Y_CLK) to meet manufacturer specifications (e.g., within +/−50 ps, etc.). The granularity of the phase adjustment is generally determined by delay elements within the circuit 74. During production testing, the circuit 74 may be configured to perform a trimming process in response to signals from automated test equipment and provide a pass/fail indication to the automated test equipment. In various embodiments, the circuit 74 may be utilized to implement the RCD in DDR4 RDIMM, DDR4 LRDIMM, DDR4 UDIMM and/or DDR5 memory modules.

The signal SCL may be a clock signal generated by the RCD 74. The signal SCL may be a clock signal that operates independently from the system clock signal (e.g., the signals BCK_T/BCKC, the signal CLK and/or the signal MCLK)). In an example, the clock signal SCL may be an I²C clock output from the RCD 74 to the PMIC 76 communicated over the point-to-point interface 62. The signal SDA may be a data signal generated by the RCD 74 and/or received by the RCD 74. For example, the signal SDA may enable the host memory controller 20 to write to the PMIC 76 through the RCD 74 and/or read from the PMIC 76 through the RCD 74. In an example, the power data signal SDA may be an I²C data input/output between the RCD 74 and the PMIC 76 communicated over the point-to-point interface 62. The RCD 74 may use the interface 62 to send/receive the power data to/from the PMIC 76. The host memory controller 20 may perform a read operation and/or a write operation to the RCD 74 as defined by the DDR5 standard. For example, the host memory controller 20 may read the power data stored in the pre-defined registers. In another example, the host memory controller 20 may write instructions for the PMIC 76 into the pre-defined registers.

The RCD 74 may use the interface 62 to perform periodic polling and/or interrupt handling. The RCD 74 may use the interface 62 to communicate to the PMIC 76 that the memory module(s) 50a-50n are in a low powered state. The PMIC 76 may detect the notification from the interrupt signal GSI_N and respond accordingly.

In some embodiments, the controller interface 180 may comprise the apparatus 100. The apparatus 100 may implement a receiver front-end configured to provide a wide programmable gain (e.g., from −6 db to +6 db). The apparatus 100 may be configured to cascade input termination and continuous-time linear equalizer (CTLE) modules. The apparatus 100 may provide the wide programmable gain range without termination performance loss. The apparatus 100 may provide sufficient peaking at higher frequency values and/or limit loading capacitance to ensure signal integrity while operating according to the DDR5 standard.

The apparatus 100 may be configured to provide an input termination impedance with programmable values connected between data input (e.g., the signal INPUTS) and VDD. The apparatus 100 may provide the data path with strong programmability for gain, AC peaking and/or bandwidth. The apparatus 100 may comprise two independent input branches. The two independent branches may be implemented to achieve the wide gain range. One of the branches implemented by the apparatus 100 may be configured for a higher gain and the other branch may be configured for a lower gain. The apparatus 100 may be configured to limit an amount of capacitive loading (e.g., which degrades the AC peaking in a higher frequency range for CTLE) caused by the extra input devices and/or routing introduced by implementing the two branches.

Figure 5:
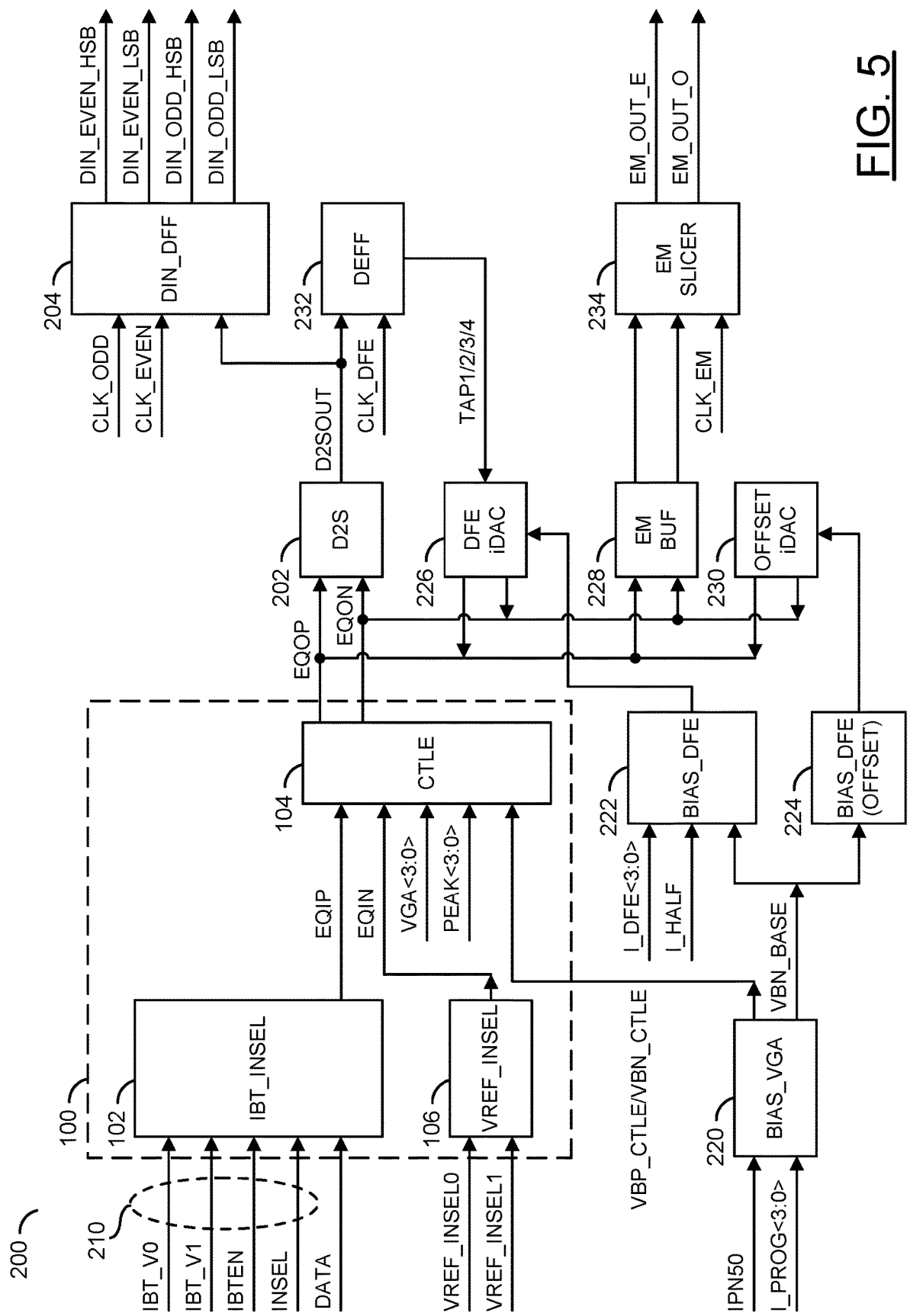
FIG. 5 is a diagram illustrating a data path for data signals.

Referring to FIG. 5, a data path 200 for data signals is shown. In one example, the data path 200 may be a receiver structure of the controller interface 180 of the RCD 74. In another example, the data path 200 may be part of the data buffers 70a-70n. Generally, the data path 200 may be implemented for components that have a design criteria for termination impedance and a wide programmable gain range.

The data path 200 may comprise the apparatus 100. The apparatus 100 may comprise a block (or circuit) 102, a block (or circuit) 104 and/or a block (or circuit) 106. The circuit 102 may implement an IBT INSEL module (e.g., the IBT module). The circuit 104 may implement a CTLE module. The circuit 106 may implement a VREF INSEL module (e.g., a reference voltage module). The apparatus 100 may comprise other components (not shown). The number, type and/or arrangement of the components of the apparatus 100 may be varied according to the design criteria of a particular implementation.

The data path 200 may further comprise a block (or circuit) 202 and/or a block (or circuit) 204. The circuit 202 may implement a D2S module. The circuit 204 may implement a DIN_DFF module (e.g., a DFF module). Generally, the input data is transmitted through the data path 200 via the cascading arrangement of the IBT module 102, the CTLE module 104, the D2S module 202 and then the DFF module 204. The data may be sampled by a clock in the DFF module 204.

The data path 200 may further comprise a block (or circuit) 220, a block (or circuit) 222, a block (or circuit) 224, a block (or circuit) 226, a block (or circuit) 228, a block (or circuit) 230, a block (or circuit) 232 and/or a block (or circuit) 234. The circuit 220 may implement a BIAS_VGA module. The circuit 222 may implement a BIAS_DFE module. The circuit 224 may implement a BIAS_DFE offset module. The circuit 226 may implement a DFE iDAC module. The circuit 228 may implement an EM buffer module. The circuit 230 may implement an offset iDAC module. The circuit 232 may implement a DEFF module. The circuit 234 may implement an EM slicer module. The circuits 220-234 may perform various functions (e.g., calculate decision feedback equalizer values) for the receiver data path 200. The data path 200 may comprise other components (not shown). The type, number, arrangement and/or functionality of the components of the data path 200 may be varied according to the design criteria of a particular implementation.

The apparatus 100 may receive a selection signal 210 (e.g., a input signal (e.g., IBT_V0), an input signal (e.g., IBT_V1), an input signal (e.g., IBTEN) and/or an input signal (e.g., INSEL)), an input signal (e.g., DATA), an input signal (e.g., VGA<3:0>), an input signal (e.g., PEAK<3:0>), an input signal (e.g., VBP_CTLE/VBN_CTLE), an input signal (e.g., VREF_INSEL0) and/or an input signal (e.g., VREF_INSEL1). The selection signal 210 (e.g., the signal IBT_V0, the signal IBT_V1, the signal IBTEN and the signal INSEL) and the signal DATA may be received by the IBT module 102. The signal VGA<3:0>, the signal PEAK<3:0> and/or the signal VBP_CTLE/VBN_CTLE may be received by the CTLE module 104. The signal VREF_INSEL0 and/or the signal VREF_INSEL1 may be received by the reference voltage module 106. The apparatus 100 may receive other signals (not shown). The number, type and/or arrangement of the input signals to the apparatus 100 may be varied according to the design criteria of a particular implementation.

The IBT module 102 may implement a selection circuit. The signal DATA may comprise the input data received by the data path 200 (e.g., the data input to the RCD 74 and/or the data buffers 70a-70n). The signal IBT_V0, the signal IBT_V1, the signal IBTEN and the signal INSEL may be components of the selection signal 210. The selection signal 210 may be configured to select a particular branch (e.g., a branch of resistors) used by the IBT module 102 and/or control a gain output of the IBT module 102 (described in detail in association with FIG. 6). The IBT module 102 may present a signal (e.g., EQIP). The signal EQIP may comprise an IBT (e.g., input bus termination) value and/or a gain value. In an example, the signal EQIP may be a voltage representing the signal DATA.

The CTLE module 104 may receive the signal EQIP output from the IBT module 102, the signal VGA<3:0>, the signal PEAK<3:0>, a signal (e.g., EQIN) output from the reference voltage module 106 and/or a signal VBP_CTLE/VBN_CTLE output from the BIAS_VGA module 220. The signal VGA<3:0> and/or the signal PEAK<3:0> may be digital control signals used by the CTLE module 104. For example, the CTLE module 104 may be configured to select a gain value in response to the signal VGA<3:0> and the output from the IBT module 102 (e.g., the signal EQIP). The signal VBP_CTLE/VBN_CTLE may be generated by the BIAS_VGA module 220. For example, the BIAS_VGA module 220 may output a bias voltage. The signal VBP_CTLE/VBN_CTLE may be a bias voltage for continuous-time linear equalization. The overall gain of the data path 200 may be generated in response to the signal INSEL (e.g., to program the gain of the IBT module 102) and/or the signals VGA<3:0> (e.g., to program the gain of the CTLE module 104). In an example, the signal PEAK<3:0> may be used to provide different AC peaking to compensate for channel loss. Generally, the peaking is preferred to be similar under different gain settings.

The signal VREF_INSEL0 and/or the signal VREF_INSEL1 may be received by the reference voltage module 106. The reference voltage module 106 may be configured to generate the signal EQIN. The signal EQIN may be presented as an input to the CTLE module 104.

The reference voltage module 106 may comprise a voltage multiplexer configured to select a suitable reference voltage. For example, the voltage multiplexer of the reference voltage module 106 may select the reference voltage from the signal VREF_INSEL0 and/or the signal VREF_INSEL1. In one example, the signal EQIN may be one of the signal VREF_INSEL0 or the signal VREF_INSEL1. Generally, the selected reference voltage may track the common mode voltage of the IBT module 102. For example, when the gain selected by the IBT module 102 is −6 dB, the voltage of the signal EQIP may be higher. Since the voltage of the signal EQIP may be higher, the reference voltage module 106 may select the higher reference voltage value (e.g., for the signal EQIN) as an input for the CTLE module 104.

The apparatus 100 may generate a signal (e.g., EQOP) and a signal (e.g., EQON). The signal EQOP and the signal EQON may be generated by the CTLE module 104. The signal EQOP and the signal EQON may be differential signals. The signal EQOP and the signal EQON may be presented as input differential signals for the D2S module 202.

The D2S module 202 may present a signal (e.g., D2SOUT) in response to the signal EQOP and the signal EQON. The signal D2SOUT may be presented to the DEFF module 232 and/or the DFF module 204. The signal D2SOUT may be a single-ended signal generated by the D2S module 202 in response to the input differential signals EQOP and EQON generated by the apparatus 100. The D2S module 202 may compare a voltage of the differential signals EQOP and EQON generated by the CTLE module 104. For example, the signal D2SOUT may be a logical high value when the voltage of the signal EQOP is larger than the voltage of the signal EQON. In another example, the signal D2SOUT may be a logical low value when the voltage of the signal EQOP is less than the voltage of the signal EQON.

The DFF module 204 may receive a clock input (e.g., a signal CLK_ODD and a signal CLK_EVEN). In an example, the signal CLK_ODD and the signal CLK_EVEN may each be a component of the signal CLK received by the RCD 74. The DFF module 204 may comprise a group of delay flip-flops with different clocks (e.g., CLK_ODD/CLK_EVEN). For example, the clock input may be used to sample the data signal D2SOUT. The DFF module 204 may present an output of the data path 200. The DFF module 204 may generate a signal (e.g., DIN_EVEN_HSB), a signal (e.g., DIN_EVEN_LSB), a signal (e.g., DIN_ODD_HSB) and/or a signal (e.g., DIN_ODD_LSB). For example, the signal DIN_EVEN_HSB and the signal DIN_EVEN_LSB may be data sampled on even clock signals and the signal DIN_ODD_HSB and the signal DIN_ODD_LSB may be data sampled on odd clock signals.

The IBT module 102, the CTLE module 104 and/or the reference voltage module 106 may work together to realize the wide programmable DC gain of the receiver 100. The IBT module 102 may be configured to provide a programmable termination impedance between the input and VDD. The IBT module 102 may be configured to realize 0 dB/−6 dB gain control. The CTLE module 104 may comprise one input branch in order to implement a 0 dB to +6 dB gain range with a 2 dB LSB. The input branch implemented by the CTLE module 104 may relieve capacitive loading at the output of the CTLE module 104.

The data path 200 may cover a wide range of programmable gain values. The apparatus 100 may implement one input differential pair (e.g., the signal EQIP and the signal EQIN) instead of two input differential pairs (e.g., one differential pair for higher gain values and one differential pair for lower gain values). For example, with two input differential pairs, each of the differential pairs may be connected together at the output, which may cause higher output capacitive loading. Implementing one input differential pair instead of two input differential pairs may lower the output capacitive loading. Since the IBT module 102 may provide the input bus termination (IBT) value and the gain value using one input differential pair, the apparatus 100 may be implemented with a lower output capacitive loading than a two input differential pair implementation.

Implementing the CTLE module 104 with two independent input branches (e.g., one specified for higher gain, and the other specified for lower gain) may result in extra input devices and/or routing to implement the branches in the CTLE module 104 and may introduce more capacitive loading (e.g., which may degrade the CTLE AC peaking in the higher frequency range). By cascading the IBT module 102 and the CTLE module 104, the gain range may cover −6 dB and +6 dB. For example, the gain value may be based on the default (e.g., 0 dB or −6 dB) gain selected by the IBT module 102. In an example, the signal INSEL may be set to low for higher gain settings and set to high for lower gain settings. A table (e.g., TABLE 1) may show a truth table for the overall DC gain:

TABLE 1

| Gain adjustment (dB) | OP2 | OP1 | OP0 | Modules CTLE 104 VGA<3:0> | IBT 102 INSEL |
|---|---|---|---|---|---|
| 0 (default) | 0 | 0 | 0 | 4'b1000 | 1'b0 |
| +6 | 0 | 0 | 1 | 4'b1111 | 1'b0 |
| +4 | 0 | 1 | 0 | 4'b1110 | 1'b0 |
| +2 | 0 | 1 | 1 | 4'b1100 | 1'b0 |
| 0 | 1 | 0 | 0 | 4'b1111 | 1'b1 |
| −2 | 1 | 0 | 1 | 4'b1110 | 1'b1 |
| −4 | 1 | 1 | 0 | 4'b1100 | 1'b1 |
| −6 | 1 | 1 | 1 | 4'b1000 | 1'b1 |

The values OP0, OP1, and/or OP2 shown in TABLE 1 may correspond to registers in the data path gain configuration. The registers OP0, OP1 and/or OP2 may be implemented according to the DDR5 standard. In one example, the registers OP0, OP1 and/or OP2 may be part of the registers 192 of the RCD 74. For example, the RCD 74 and/or the data buffers 70a-70n may implement a decoder configured to translate the values of the registers OP0, OP1 and/or OP2 to the signal INSEL and/or the signals VGA<3:0> provided to the apparatus 100.

The cascade arrangement of the IBT module 102 and the CTLE module 104 may implement multiple gain stages for the receiver 100. The IBT module 102 may be configured to provide a first gain stage. The gain stage provided by the IBT module 102 may be a gain of 0 dB or −6 dB. The CTLE module 104 may provide a second gain stage. The gain stage provided by the CTLE module 104 may be varied according to the design criteria of a particular implementation. The overall data path provided by the apparatus 100 may provide a gain adjustment value of −6 dB/−4 dB/−2 dB/0 dB/2 dB/4 dB/6 dB corresponding to the gain value of the CTLE module 104 and/or the IBT module 102.

Figure 6:
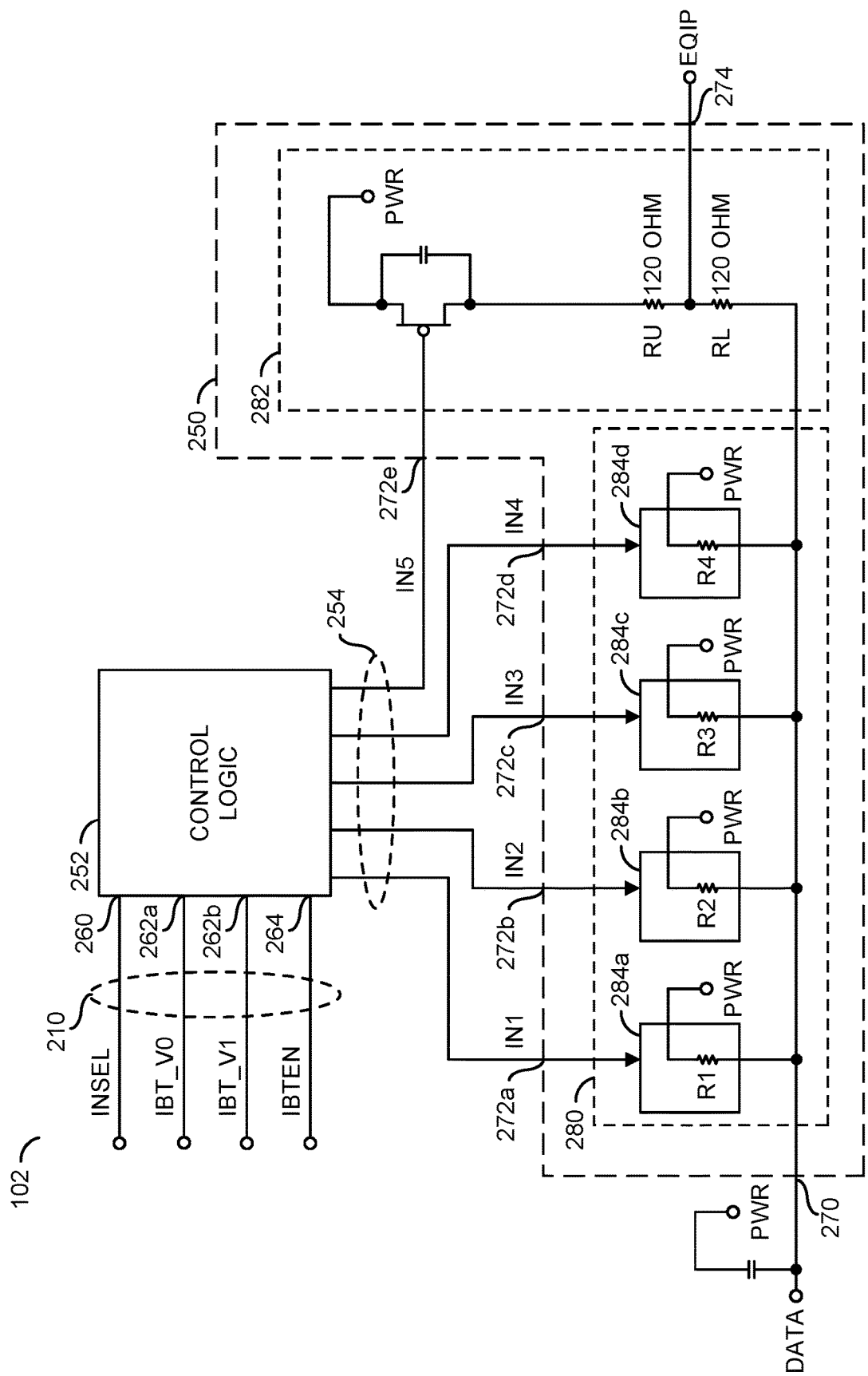
FIG. 6 is a diagram illustrating a selection circuit.

Referring to FIG. 6, a diagram illustrating a selection circuit 102 is shown. The selection circuit may be the IBT module 102. The IBT module 102 may be configured to provide a selection in order to adjust a gain setting. The IBT module 102 may be configured to provide a 0 dB gain or a −6 db gain by implementing resistor division. The IBT module 102 may be configured to select the IBT value. The IBT module 102 may be configured to ensure signal integrity for the data path 200 operating according to the DDR5 standard.

The IBT module 102 may comprise a block (or circuit) 250 and/or a block (or circuit) 252. The circuit 250 may implement a branch selection block. The circuit 252 may implement control logic. The control logic 252 may be configured to present an activation signal 254 to the branch selection block 250. The branch selection block 250 may select an IBT value and/or a gain in response to the activation signal 254. The IBT module 102 may comprise other components (not shown). For example, the IBT module 102 may comprise electrostatic discharge (ESD) diodes. The number, type and/or arrangement of the components of the IBT module 102 may be varied according to the design criteria of a particular implementation.

The IBT module 102 may comprise an input 260, inputs 262a-262b and/or an input 264. The input 260, the inputs 262a-262b and/or the input 264 may correspond to the input of the control logic 252. The input 260 may receive the signal INSEL. The input 262a may receive the signal IBT_V0. The input 262b may receive the signal IBT_V1. The input 264 may receive the signal IBTEN. The input 260, the inputs 262a-262b and/or the input 264 may comprise an interface of the IBT module 102 that may be configured to receive the components of the selection signal 210.

The branch selection block 250 may comprise an input 270 a number of inputs 272a-272e and/or an output 274. The input 270 may be an input of the IBT module 102 (e.g., an interface configured to receive the input signal DATA). The inputs 272a-272e may be internal to the IBT module 102. In some embodiments, the input 260, the inputs 262a-262b, the input 264 and/or the input 270 may be configured as a single input interface for the IBT module 102 and/or the apparatus 100. The output 274 may be an output of the IBT module 102. The inputs 272a-272e may receive the activation signal 254. The activation signal 254 may comprise a number of signal components (e.g., IN1-IN5). For example, the input 272a may receive the signal IN1, the input 272b may receive the signal IN2, the input 272c may receive the signal IN3, the input 272d may receive the signal IN4, and the input 272e may receive the signal IN5.

In some embodiments, the control logic 252 may comprise a network of logic circuitry. In some embodiments, the control logic 252 may be a programmable circuit. The control logic 252 may be configured to generate the activation signal 254 in response to the selection signal 210 (e.g., the signal INSEL, the signal IBT_V0, the signal IBT_V1 and/or the signal IBTEN). The signal IBT_V0 and the signal IBT_V1 may each be configured to select an impedance value for the IBT module 102. The signal INSEL may be configured as a swap signal to switch between two different modes of operation for the IBT module 102 (e.g., one mode that provides a 0 dB gain setting and one mode that provides a −6 dB gain setting). The signal IBTEN may be an enable signal. In one example, the control logic 252 may be a decoder under the VDD/VSS_REG domain. In another example, the control logic 252 may implement an interface for the IBT module 102. For example, the logic circuitry of the control logic 252 may assert each of the signals IN1-IN5 to a logical high state or a logical low state (e.g., ON/OFF). A table (e.g., TABLE 2) may show a truth table for the control logic 252:

TABLE 2

| IBTEN | IBT_V1 | IBT_V0 | INSEL | IN1 | IN2 | IN3 | IN4 | IN5 |
|---|---|---|---|---|---|---|---|---|
| 1 | 0 | 0 | 0 | ON | ON | ON | ON | OFF |
| 1 | 0 | 0 | 1 | ON | ON | ON | OFF | ON |
| 1 | 0 | 1 | 0 | OFF | OFF | ON | ON | OFF |
| 1 | 0 | 1 | 1 | OFF | OFF | ON | OFF | ON |
| 1 | 1 | 0 | 0 | OFF | OFF | OFF | ON | OFF |
| 1 | 1 | 0 | 1 | OFF | OFF | OFF | OFF | ON |
| 1 | 1 | 1 | x | OFF | OFF | OFF | OFF | OFF |
| 0 | x | x | x | OFF | OFF | OFF | OFF | OFF |

The branch selection block 250 may comprise a block (or circuit) 280 and/or a block (or circuit) 282. The circuit 280 may implement a resistor branch selection block. The circuit 282 may implement an impedance branch. The resistor branch selection block 280 may receive the signals IN1-IN4. The impedance branch 282 may receive the signal IN5. The resistor branch selection block 280 may comprise blocks (or circuits) 284a-284d. The blocks 284a-284d may each comprise an impedance branch. The resistor branch selection block 280 and/or the impedance branch 282 may receive the input signal DATA. The impedance branch 282 may present the output signal EQIP (e.g., via the output 274). The branch selection block 250 may comprise other components (not shown). The number, type and/or arrangement of the components of the branch selection block 250 may be varied according to the design criteria of a particular implementation.

The circuit 282 may be configured to implement an impedance value and a gain value (e.g., an attenuation of −6 dB). In an example, the circuit 282 may be an impedance and gain branch. The circuits 284a-284d may each implement an impedance value. The impedance branch 282 may be an impedance branch separated from the group of impedance branches 284a-284d. For example, the impedance branch 282 may be a separated branch from the group of branches 284a-284d.

The IBT module 102 may comprise at least five resistor branches (e.g., the impedance and gain branch 282 and the group of impedance branches 284a-284d). The impedance branch 282 and the impedance branches 284a-284d may each comprise a transistor to implement a switch for activating each branch (e.g., a PMOS transistor). In an example, when the PMOS transistor gate is set to a logical '0' the branch may be turned ON (e.g., activated) and when the PMOS transistor gate is set to a logical '1' the branch may be turned OFF (e.g., ON for IN1-IN5 in TABLE 2 may correspond to a logical low value). For example, the signal IN5 may correspond to the signal INSEL (e.g., the control logic 252 may pass through the signal INSEL as the signal IN5 and the impedance branch 282 may be controlled by the signal INSEL).

The impedance branches 284a-284d may be configured in a parallel arrangement. Each of the impedance branches 284a-284n may comprise a resistance. In the example shown, the impedance branch 284a may comprise the resistor R1, the impedance branch 284b may comprise the resistor R2, the impedance branch 284c may comprise the resistor R3, and the impedance branch 284d may comprise the resistor R4. The resistors R1-R4 may be connected to a common source and/or node. In the example shown, the common source/node may be a signal (e.g., PWR). For example, the signal PWR may be a connection to VDD. In another example, the common source/node may be a ground. The resistors R1-R4 may be digitally selectable (e.g., using the signals IN1-IN4). For example, each of the impedance branches 284a-284d may comprise a PMOS transistor (not shown) configured to enable the corresponding resistors R1-R4.

The impedance branches 284a-284n may be configured to implement the IBT value with 4 bits trimming. In one example, each of the resistors R1-R4 may provide a 240 Ohm resistance as an impedance value. The impedance branches 284a-284d may have trimmable impedance values. Trimming the impedance values of the impedance branches 284a-284d may provide more accurate values. For example, the impedance branches 284a-284d may each be trimmed with suitable control to provide impedance values of 60 Ohms, 120 Ohms and 240 Ohms. In one example, since each of the branches 284a-284d provides 240 Ohms, the IBT values of 60 Ohms, 120 Ohms or 240 Ohms may be selected by enabling 4, 2 or 1 of the branches 284a-284d in parallel, respectively. The IBT value may be the termination resistance at the net pad. For example, the IBT value may be selected to prevent a reflection of the signal DATA.

The impedance branch 282 may be configured in a parallel arrangement with the impedance branches 284a-284d. The impedance branch 282 may be configured to implement an impedance value and a gain value. The impedance branch 282 may comprise a transistor (e.g., a PMOS transistor), a resistor RU and/or a resistor RL. The transistor may receive the signal IN5 (e.g., controlled by the input signal INSEL). The impedance branch 282 may be separated into two parts using the PMOS transistor. For example, the upper resistance RU may be selected (e.g., activated) using the PMOS transistor. In an example, the upper resistance RU may be selected by providing a path to the common source/node as the resistors R1-R4 (e.g., PWR). The signal EQIP may be presented at a node between the upper resistor RU and the lower resistance RL. For example, the signal DATA may be presented through the transistor RL and presented as the signal EQIP at the output 274.

The resistance RU and the resistance RL may have approximately equal impedance values. In an example, the resistance RU may have an impedance value of 120 Ohms and the resistance RL may have an impedance value of 120 Ohms. When the impedance branch 282 is selected, the resistance RU and the resistance RL may be implemented to realize a −6 dB gain using resistor division. For example, using resistor division, the voltage at the node between the resistance RL and the resistance RU may be half the input value (e.g., 20 log(0.5) is equal to approximately −6 dB). When the impedance branch 282 is selected, the resistance RU and the resistance RL may be combined to provide the same resistance as the impedance provided by one of the resistors R1-R4 (e.g., 240 Ohms). When the impedance branch 282 is not selected (e.g., the signal INSEL is not asserted and the path to the common source/node PWR is not available), the resistor division corresponding to the resistor RU and RL may not be implemented and no gain change occurs (e.g., 0 dB gain for the signal EQIP).

The IBT module 102 may be configured to select the IBT value to realize the termination impedance and/or support a 0 dB or −6 dB gain by register control. The signal INSEL may be a swap signal. The swap signal INSEL may be implemented to turn the impedance branch 282 on or off (e.g., activate the resistor RU by providing a path to the common source PWR). For example, the PMOS transistor of the impedance branch 282 may provide the logic for turning the impedance branch 282 on or off. In some embodiments, the impedance branch may implement PMOS transistors in a cascode configuration. When the impedance branch 282 is activated, the IBT module 102 may provide a gain value of −6 dB. When the impedance branch 282 is not activated, the IBT module 102 may provide a gain value of 0 dB.

Generally, the IBT module 102 may select at most four out of the five available parallel branches (e.g., from the impedance branch 282 and the impedance branches 284a-284d). The control logic 252 may be configured to select a combination of the impedance and gain branch 282 and/or the impedance branches 284a-284d, to provide the termination resistance. If a 0 dB gain is desired, the control logic 252 may select from the impedance branches 284a-284d. If a −6 dB gain is desired, the control logic 252 may select the impedance branch 282 and, if needed to achieve the desired termination impedance, up to three of the impedance branches 284a-284d. To provide the −6 dB gain, the impedance branch 282 may be used instead of (e.g., replace) one of the impedance branches 284a-284d. When the impedance branch 282 replaces one of the impedance branches 284a-284d, the DC gain value may be −6 dB while keeping the same termination resistance (e.g., since the branch 282 and each of the branches 284a-284d each provide a 240 Ohm resistance). In the example shown in association with TABLE 2, the impedance branch 282 may replace and/or swap an on/off status with the impedance branch 284d to provide the −6 dB gain.

Using the swap signal INSEL may enable the IBT module 102 to realize the gain value of 0 dB or −6 dB without termination performance loss. Termination performance loss may be prevented since each of the branch 282 and the branches 284a-284d provide the same resistance in parallel.

Replacing one of the branches 284a-284d with the impedance branch 282 may provide the same total termination resistance for the input signal DATA. The IBT module 102 may provide different gain settings while keeping the same termination resistance. A table (e.g., TABLE 3) may show an impedance/gain truth table for the IBT module 102:

TABLE 3

| IBTEN | IBT_V1 | IBT_V0 | INSEL | IBT_value | GAIN (dB) |
|---|---|---|---|---|---|
| 1 | 0 | 0 | 0 | 60 | 0 |
| 1 | 0 | 0 | 1 | 60 | −6 |
| 1 | 0 | 1 | 0 | 120 | 0 |
| 1 | 0 | 1 | 1 | 120 | −6 |
| 1 | 1 | 0 | 0 | 240 | 0 |
| 1 | 1 | 0 | 1 | 240 | −6 |
| 1 | 1 | 1 | x | hiZ | 0 |
| 0 | x | x | x | hiZ | 0 |

As shown in TABLE 3, the output signal EQIP may have a gain of 0 when the signal INSEL is not asserted (e.g., when the impedance branch 282 is not activated) and a gain of −6 dB when the signal INSEL is asserted (e.g., when the impedance branch is activated). In one example, to realize a 60 Ohm resistance with a 0 dB gain setting, all four of the branches 284a-284d may be turned on (e.g., IBSEL=OFF). With all four of the branches 284a-284d providing 240 Ohms in parallel, the total resistance seen by the signal DATA may be 60 Ohms. If the signal INSEL is ON, then three of the branches 284a-284d may be turned on, and the impedance branch 282 may be turned on. With the three branches (e.g., 284a-284c) and the impedance branch 282 each providing 240 Ohms in parallel, the total resistance seen by the signal DATA may still be 60 Ohms and the impedance branch 282 may further provide the −6 dB gain setting.

Figure 7:
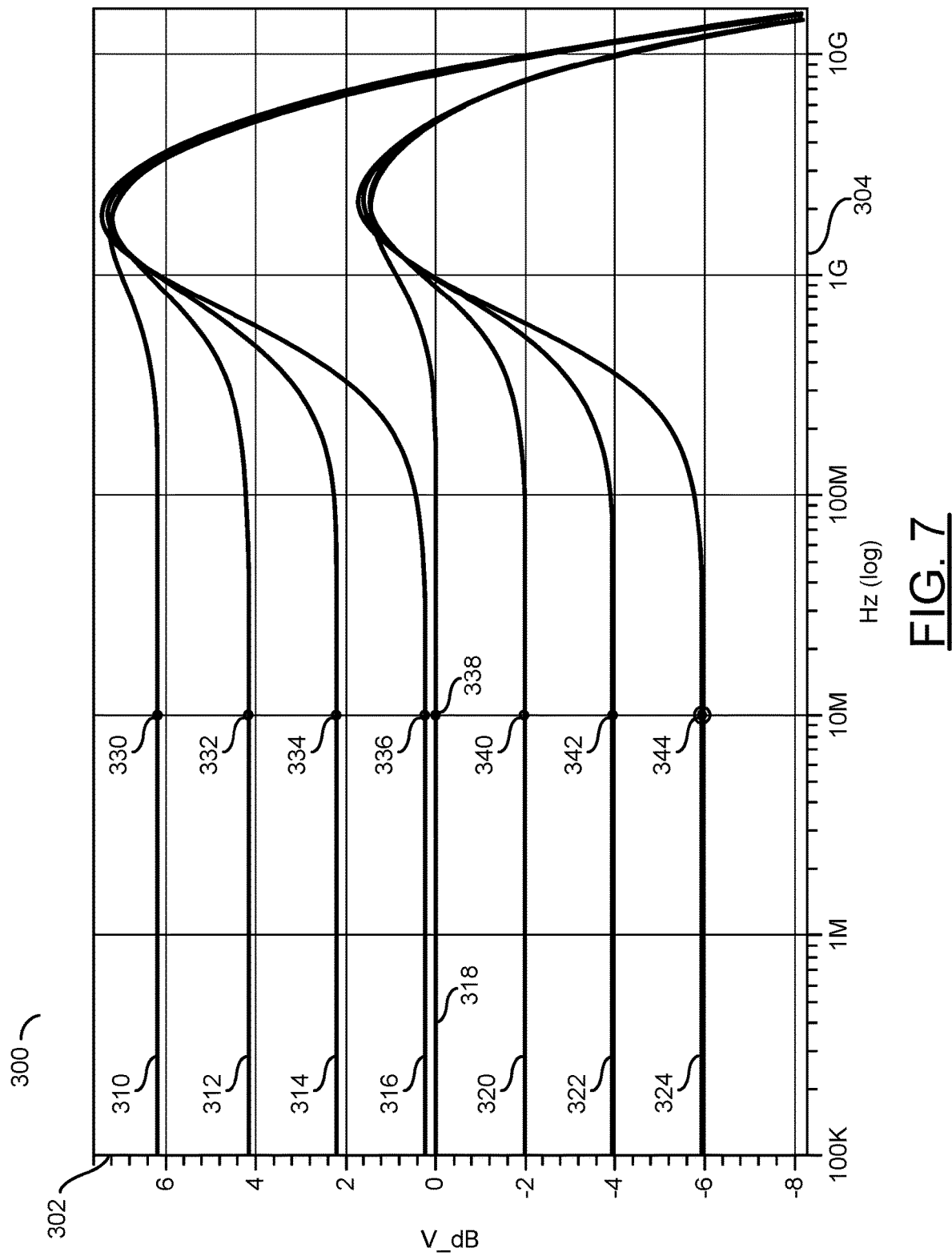
FIG. 7 is a diagram illustrating an AC evaluation of a data path.

Referring to FIG. 7, a diagram illustrating a graph 300 of an AC evaluation of the data path 200 shown. The graph 300 may have a Y axis 302 and an X axis 304. The Y axis 302 may represent a measurement of voltage gain in dB. The X axis may represent a frequency in Hz on a logarithmic scale. The graph 300 may illustrate the AC performance of the receiver 100. For example, the receiver 100 may be tested/probed and higher peaking may indicate the structure of the data path 200 having the cascading IBT module 102 and the CTLE module 104.

A line 310, a line 312, a line 314, a line 316, a line 318, a line 320, a line 322 and a line 324 are shown on the graph 300. The lines 310-324 may represent an output voltage of the CTLE module 104 (e.g., the signal EQOP and/or the signal EQON) in response to various input configurations of the apparatus 100. In the example shown, the various input configurations may be described according to a logical high (or a logical '1' value) and/or a logical low (or logical '0' value). However, the input configurations may also be configured to respond similarly when the input references are reversed.

The lines 310-324 may represent the AC evaluation on the data path 200 over the various relative gain settings that may be achieved by the apparatus 100. In the example shown, the lines 310-324 may represent the AC behavior over all the relative gain settings of the apparatus 100 using a maximum peaking. For example, the maximum peaking may be achieved when the signal PEAK<3:0> has a value of 4'b1111. Generally, CTLE may be preferred for equalization for a dedicated channel degradation. The apparatus 100 may be configured to provide peaking/gain programmability to cover different channels.

The line 310 may represent the output of the CTLE module 104 when the signal VGA[0] has a logical high value, the signal VGA[1] has a logical high value, the signal VGA[2] has a logical high value, the signal VGA[3] has a logical high value and the signal INSEL has a logical low value. A point 330 is shown on the line 310. The point 330 may represent a relative gain value of the line 310 at approximately 10 MHz. The line 310 may have a relative gain value of approximately +6.172 dB.

The line 312 may represent the output of the CTLE module 104 when the signal VGA[0] has a logical low value, the signal VGA[1] has a logical high value, the signal VGA[2] has a logical high value, the signal VGA[3] has a logical high value and the signal INSEL has a logical low value. A point 332 is shown on the line 312. The point 332 may represent a relative gain value of the line 312 at approximately 10 MHz. The line 312 may have a relative gain value of approximately 4.03 dB.

The line 314 may represent the output of the CTLE module 104 when the signal VGA[0] has a logical low value, the signal VGA[1] has a logical low value, the signal VGA[2] has a logical high value, the signal VGA[3] has a logical high value and the signal INSEL has a logical low value. A point 334 is shown on the line 314. The point 334 may represent a relative gain value of the line 314 at approximately 10 MHz. The line 314 may have a relative gain value of approximately 2.15 dB.

The line 316 may represent the output of the CTLE module 104 when the signal VGA[0] has a logical low value, the signal VGA[1] has a logical low value, the signal VGA[2] has a logical low value, the signal VGA[3] has a logical high value and the signal INSEL has a logical low value. A point 336 is shown on the line 316. The point 336 may represent a relative gain value of the line 316 at approximately 10 MHz. The line 316 may have a relative gain value of approximately 0.18 dB.

The line 318 may represent the output of the CTLE module 104 when the signal VGA[0] has a logical high value, the signal VGA[1] has a logical high value, the signal VGA[2] has a logical high value, the signal VGA[3] has a logical high value and the signal INSEL has a logical high value. A point 338 is shown on the line 318. The point 338 may represent a relative gain value of the line 318 at approximately 10 MHz. The line 318 may have a relative gain value of approximately −0.02 dB.

The line 320 may represent the output of the CTLE module 104 when the signal VGA[0] has a logical low value, the signal VGA[1] has a logical high value, the signal VGA[2] has a logical high value, the signal VGA[3] has a logical high value and the signal INSEL has a logical high value. A point 340 is shown on the line 320. The point 340 may represent a relative gain value of the line 320 at approximately 10 MHz. The line 320 may have a relative gain value of approximately −1.96 dB.

The line 322 may represent the output of the CTLE module 104 when the signal VGA[0] has a logical low value, the signal VGA[1] has a logical low value, the signal VGA[2] has a logical high value, the signal VGA[3] has a logical high value and the signal INSEL has a logical high value. A point 342 is shown on the line 322. The point 342 may represent a relative gain value of the line 322 at approximately 10 MHz. The line 322 may have a relative gain value of approximately −3.94 dB.

The line 324 may represent the output of the CTLE module 104 when the signal VGA[0] has a logical low value, the signal VGA[1] has a logical low value, the signal VGA[2] has a logical low value, the signal VGA[3] has a logical high value and the signal INSEL has a logical high value. A point 344 is shown on the line 324. The point 344 may represent a relative gain value of the line 324 at approximately 10 MHz. The line 324 may have a relative gain value of approximately −5.9 dB.

The functions and structures illustrated in the diagrams of FIGS. 1 to 7 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

Although embodiments of the invention have been described in the context of a DDR4 and a DDR5 application, the present invention is not limited to DDR4 or DDR5 applications, but may also be applied in other high data rate digital communication applications where different transmission line effects, cross-coupling effects, traveling wave distortions, phase changes, impedance mismatches and/or line imbalances may exist. The present invention addresses concerns related to high speed communications, flexible clocking structures, specified command sets and lossy transmission lines. Future generations of DDR can be expected to provide increasing speed, more flexibility, additional commands and different propagation characteristics. The present invention may also be applicable to memory systems implemented in compliance with either existing (legacy) memory specifications or future memory specifications.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a memory interface implemented in a data path configured to receive a data signal and a plurality of selection signals; and
   a plurality of impedance branches (i) comprising a group of branches and a separated branch and (ii) configured to adjust an impedance value and a gain of said data path for said data signal in response to said selection signals, wherein (i) said group of branches are controlled in response to said selection signals to select said impedance value and a first gain value in a first mode, (ii) said separated branch replaces one of said plurality of impedance branches in said group of branches in response to said selection signals to select a second gain value in a second mode and (iii) said apparatus is configured to generate one component of a single input differential pair for both high gain values and low gain values.

2. The apparatus according to claim 1, wherein said selection signals comprise an enable signal, a first signal, a second signal and a swap signal.

3. The apparatus according to claim 2, wherein said swap signal selects between said first mode and said second mode.

4. The apparatus according to claim 2, wherein said impedance value is selected in response to said first signal and said second signal.

5. The apparatus according to claim 1, wherein said plurality of impedance branches are configured to adjust said impedance value to one of 60 Ohms, 120 Ohms, 240 Ohms and a high impedance state.

6. The apparatus according to claim 1, wherein said impedance value is a termination resistance for said data signal.

7. The apparatus according to claim 6, said termination resistance is selected to prevent signal reflections.

8. The apparatus according to claim 1, wherein said first gain value is 0 dB and said second gain value is −6 dB.

9. The apparatus according to claim 1, wherein said separated branch comprises an upper resistor and a lower resistor.

10. The apparatus according to claim 9, wherein (i) said upper resistor and said lower resistor provide a same resistance value and (ii) when said separated branch is activated, said gain is adjusted by −6 dB by implementing resistor division of said upper resistor and said lower resistor.

11. The apparatus according to claim 9, wherein said upper resistor and said lower resistor each provide a 120 Ohm resistance.

12. The apparatus according to claim 11, wherein said upper resistor and said lower resistor are combined to provide a 240 Ohm resistance when said separated branch is activated.

13. The apparatus according to claim 1, wherein said group of branches comprises four impedance branches, each providing a same resistance value.

14. The apparatus according to claim 1, wherein said apparatus realizes said gain for said data path while providing a same termination resistance in said first mode and in said second mode.

15. The apparatus according to claim 1, wherein (i) said plurality of impedance branches are configured in a parallel arrangement and (ii) said separated branch replaces one of said plurality of impedance branches in said group of branches by activating said separated branch and deactivating said one of said plurality of impedance branches.

16. The apparatus according to claim 1, wherein said apparatus is configured to communicate with a Continuous-Time Linear Estimation module.

17. The apparatus according to claim 16, wherein (i) a first gain range and a second gain range implement a gain from −6 dB to 6 dB, (ii) said apparatus is configured to implement said first gain range and (iii) said Continuous-Time Linear Estimation module is configured to implement said second gain range.

18. The apparatus according to claim 1, wherein each of said plurality of impedance branches and said separated branch each comprise a PMOS transistor configured to activate a resistance value in response to said selection signals.

19. The apparatus according to claim 1, further comprising a control logic configured to select from said impedance branches in response to said selection signals.

20. An apparatus comprising:
a memory interface implemented in a data path configured to receive a data signal and a plurality of selection signals; and
a plurality of impedance branches (i) comprising a group of branches and a separated branch and (ii) configured to adjust an impedance value and a gain of said data path for said data signal in response to said selection signals, wherein (i) said group of branches are controlled in response to said selection signals to select said impedance value and a first gain value in a first mode, (ii) said separated branch replaces one of said plurality of impedance branches in said group of branches in response to said selection signals to select a second gain value in a second mode and (iii) said apparatus is configured to communicate with a Continuous-Time Linear Estimation module.

* * * * *